(12) United States Patent
Song et al.

(10) Patent No.: US 8,730,821 B2
(45) Date of Patent: May 20, 2014

(54) PACKET LOSS RATE DETECTION METHOD, APPARATUS, AND SYSTEM

(75) Inventors: Jianmin Song, Shenzhen (CN); Jun Li, Shenzhen (CN); Peng Ma, Shenzhen (CN); Jiahong Wei, Shenzhen (CN); Yonghui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 662 days.

(21) Appl. No.: 13/085,695

(22) Filed: Apr. 13, 2011

(65) Prior Publication Data
US 2011/0188380 A1     Aug. 4, 2011

Related U.S. Application Data

(63) Continuation of application No. PCT/CN2009/074094, filed on Sep. 22, 2009.

(30) Foreign Application Priority Data

Oct. 14, 2008   (CN) .......................... 2008 1 0217022

(51) Int. Cl.
*H04L 12/28*  (2006.01)
(52) U.S. Cl.
USPC ........................................ 370/241.1
(58) Field of Classification Search
None
See application file for complete search history.

(56) References Cited

U.S. PATENT DOCUMENTS

| 2007/0064611 A1* | 3/2007 | He ............................. 370/236.2 |
| 2008/0031146 A1 | 2/2008 | Kwak et al. |
| 2010/0302949 A1 | 12/2010 | Fukagawa |
| 2011/0164502 A1* | 7/2011 | Mohan et al. .............. 370/236.2 |
| 2011/0182186 A1* | 7/2011 | Vigoureux et al. ........ 370/241.1 |
| 2012/0076029 A1* | 3/2012 | Mohan .......................... 370/252 |

FOREIGN PATENT DOCUMENTS

| CN | 1842033 A | 10/2006 |
| CN | 101926154 A | 12/2010 |
| WO | WO 2008/080256 A1 | 7/2008 |
| WO | WO 2008/117379 A1 | 10/2008 |
| WO | WO 2010/043145 A1 | 4/2010 |

OTHER PUBLICATIONS

International Telecommunications Union (ITU-T Y.1731 Amendment 1 (Jul. 2010)); Series Y: Global Information Infrastructure, Internet Protocol Aspects and Next-Generation Networks; Internet protocol aspects—Operation, administration and maintenance; OAM functions and mechanisms for Ethernet based networks (17 pgs.).
International Search Report issued in related Application No. PCT/CN2009/074094; dated (mailed) Dec. 31, 2009 (6 pgs.).
Written Opinion of the International Searching Authority in corresponding PCT Patent Application No. PCT/CN2009/074094 (Dec. 31, 2009).
$2^{nd}$ Office Action in corresponding Chinese Patent Application No. 200810217022.8 (Feb. 22, 2013).

* cited by examiner

*Primary Examiner* — Chirag Shah
*Assistant Examiner* — Amar Persaud
(74) *Attorney, Agent, or Firm* — Leydig, Voit & Mayer, Ltd.

(57) ABSTRACT

A packet loss rate detection method, apparatus, and system relating to a Packet Switching Network (PSN) are provided, and the method includes: transmitting, by a transmitting end, data packets and Operation, Administration, and Maintenance (OAM) packets, and writing a counting value of the data packets into the subsequent OAM packets after a time delay, and receiving, by a receiving end, the data packets and the OAM packets, counting a number of the received data packets, and calculating a packet loss rate based on the number of the practically received data packets and the counting value carried in the OAM packets.

9 Claims, 2 Drawing Sheets

PACKET LOSS RATE DETECTION METHOD, APPARATUS, AND SYSTEM

CROSS-REFERENCE TO RELATED APPLICATIONS

This application is a continuation of International Application No. PCT/CN2009/074094, filed on Sep. 22, 2009, which claims priority to Chinese Patent Application No. 200810217022.8, filed on Oct. 14, 2008, both of which are hereby incorporated by reference in their entireties.

FIELD OF THE INVENTION

The present invention relates to the field of communications technologies, and in particular, to a packet loss rate detection method, apparatus, and system.

BACKGROUND OF THE INVENTION

In a Packet Switching Network (PSN), in addition to service data transferring and forwarding among devices, Operation, Administration, and Maintenance (OAM) also needs to be performed on the data, and a packet carrying an OAM message is called an OAM packet. The OAM packet and the data packet employ the same transfer channel and forwarding mechanism, and only the contents thereof are different in that the OAM packet carries certain administration information. The OAM packets are periodically transferred among devices based on certain protocols and standards, so as to realize exchange of the administration information. Therefore, the OAM packet can reflect working states of the data packet and a service channel. Functions such as network performance detection, fault detection and location, and trigger protection switching can be realized by using the information carried in the OAM packet, in which the network performance detection mainly includes tests on packet loss rate, delay, jitter, and throughput.

The packet loss rate is one of the major indexes for measuring the quality of a PSN physical or logical link, which can be understood as a ratio of a total number of lost data packets detected by a receiving end and the total number of the data packets transmitted by a transmitting end on a link at a particular network level in a certain period. The packet loss rate detection generally employs a mode of transmitting by a source end and checking by a destination end, that is, the source end records the number of the transmitted data packets, and the destination end checks whether the number of the practically received data packets is the same with the number of the data packets transmitted by the source end.

The packet loss rate detection technology in the prior art mainly employs the method in which the source end periodically writes a counting value of the transmitted data packets into an OAM packet, and the destination end counts and checks the received data packets. That is, the transmitting end counts the transmitted data packets, and periodically transmits the OAM packets while transmitting the data packets, in which the OAM packet carries the counting value of a data packet counter before the OAM packet is transmitted. As shown in FIG. 1, packet 101 are the data packets, and the transmitting end writes the counting value of the data packets transmitted before packet 102 into packet 102.

The receiving end receives the data packets and the OAM packets, also uses the counter to count the received data packets, parses the OAM packets to obtain the counting value, and performs subtraction between the counting values of two consecutive OAM packets such as packet 102 and 103, and the difference thereof is the number of the data packets transmitted by the source end in a measurement period. The difference in the counter for the data packets at the receiving end in the measurement period of the receiving end is the number of the data packets practically received by the destination end. The result calculated through (the number of data packets transmitted by the source end–the number of data packets practically received by the destination end)/the number of data packets transmitted by the source end is the packet loss rate.

Since priorities of the data packets vary in the PSN network technology, the packets with high priority are transmitted first, so it takes a certain period of time (though very short) for transmission and conversion of queues with different levels of priority, while in the queues with the same level of priority, it also takes a certain period of time (though very short) to write the counting value of a transmission counter at the source end into the OAM packet. Since the data packets are transmitted continuously, when the counting value of the transmitting end is written into the OAM packet, the data packets not counted might be transmitted and the data packets counted might be not transmitted, leading to a certain error between the counting value in the OAM packet and the number of the practically transmitted data packets, and in the end resulting in the incorrect calculation of the packet loss rate, thus failing to reflect the practical condition of the link.

The solution may be controlling the transmitting sequence of the packets. In this manner, before and after the OAM packet is inserted into a transmission queue, the data packets cannot be inserted. Alternatively, the counting value in the OAM packet should be written and inserted fast enough, which requires additional hardware support. In one aspect, the forwarding technology in the prior art needs to be modified, which leads to poor generality, high cost, and increased processing complexity; and in another aspect, performance indexes such as network delay are affected to a certain degree.

SUMMARY OF THE INVENTION

The present invention is directed to a packet loss rate detection method and system without adding hardware support.

An embodiment of the present invention provides a packet loss rate detection method, where the method includes the following steps: transmitting, by a transmitting end, data packets and OAM packets, and writing a counting value of the data packets before the transmission of the OAM packet into an Nth OAM packet subsequent to the OAM packet, in which N is a positive integer greater than or equal to 1; and receiving, by a receiving end, the data packets and the OAM packets transmitted by the transmitting end, and calculating a packet loss rate according to the number of the received data packets and the counting value carried in the OAM packets.

An embodiment of the present invention provides a data transmitting apparatus, where the data transmitting apparatus includes a data transmission module configured to transmit data packets and OAM packets, and write a counting value of the data packets before the transmission of an OAM packet into an Nth OAM packet subsequent to the OAM packet, in which N is a positive integer greater than or equal to 1.

An embodiment of the present invention further provides a packet loss rate detection system, where the system includes:

a transmitting end, configured to transmit data packets and OAM packets, and write the number of the data packets transmitted before the transmission of the OAM packet into an Nth OAM packet subsequent to the OAM packet, in which N is a positive integer greater than or equal to 1; and a receiving end, configured to receive the data packets and the OAM packets, and calculate a packet loss rate according to the number of the received data packets and a counting value carried in the OAM packets.

In the embodiments of the present invention, the number of the data packets is written into the OAM packets after a time delay, so that the device has enough time to accurately count the data packets practically transmitted in a transmission interval between the two consecutive OAM packets, thus avoiding miscount of the data packets and ensure more accurate count. Since neither the hardware support needs to be added nor the forwarding technology in the prior art needs to be modified, the present invention has good generality and can be easily implemented.

DETAILED DESCRIPTION OF THE EMBODIMENTS

The technical solution of the present invention will be clearly and fully described bellow with reference to the accompanying drawings.

Figure 1:
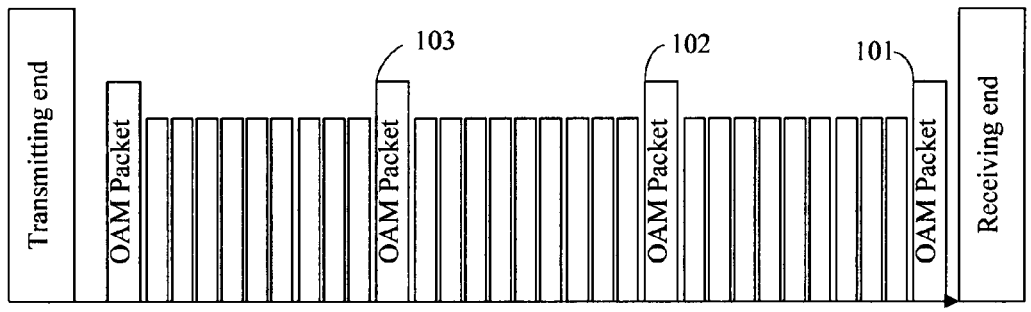
FIG. 1 is a schematic view of writing data packets into a current OAM packet in the prior art.
Figure 2:
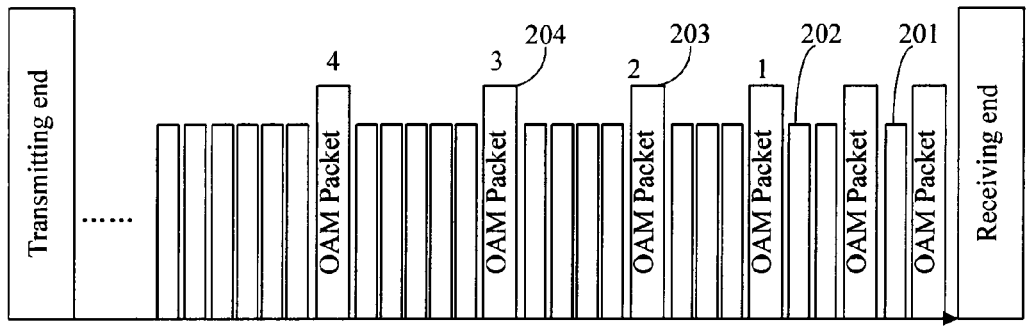
FIG. 2 is a schematic view of a first embodiment of the present invention.

The first embodiment of the present invention provides a method for detecting a packet loss rate, which relates to a transmitting end and a receiving end. The transmitting end transmits data packets and periodically transmits OAM packets, and the receiving end receives the data packets and the OAM packets. As shown in FIG. 2, the transmitting end periodically transmits OAM packets, for example OAM packet 203. At the transmitting end, a counting value of the data packets undergoes a time delay of a transmission period of the OAM packets (a time delay of N periods if required, in which N is a positive integer greater than or equal to 1) and is written into the OAM packet to be transmitted in a current period, for example, a counting value 3 of the data packets transmitted prior to the transmission of the OAM packet 203 is written into an OAM packet 204 instead of the OAM packet 203. The receiving end receives the data packets and the OAM packets, counts the number of the received data packets, parses the OAM packets to obtain the counting value in the OAM packets, and calculates the packet loss rate, which includes the following steps.

In Step 21, a Maintenance Entity Point (MEP) of the transmitting end periodically (a test period, configured as required) transmits an OAM packet carrying a counting value of a particular data packet transmission counter.

In Step 22, the counter of the transmitting end counts the transmitted data packets in real time, and the transmitting end saves data of the counting values of several periods (set as required).

In Step 23, at the MEP of the transmitting end, each OAM packet carries the counting value of the data packets transmitted prior to the transmission of the OAM packet's previous one OAM packet (or previous N OAM data packets), for example, the OAM packet 204 saves the counting value of the data packets before the transmission of the OAM packet 203 instead of the counting value of the data packets transmitted prior to the transmission of the OAM packet 204.

In Step 24, the MEP of the receiving end parses the received OAM packets to obtain the counting value carried in the received OAM packets.

In Step 25, the receiving end saves the data of the counting values of the data packets practically received in periods of a data packet 201 and data packet 202 (several periods may be saved as required), and performs subtraction between the counting values carried in the OAM packet 203 and the OAM packet 204 to obtain the number of the data packets transmitted by the transmitting end in the period between the OAM packet transmitted later than the data packet 202 and the OAM packet 203.

In Step 26, the receiving end performs subtraction between the counting value of the data packets received in test period of the data packet 201 and the counting value of the data packets received in the test period of the data packet 202 to obtain the number of the data packets practically received by the receiving end.

In Step 27, the packet loss rate in the test period is calculated according to the formula (the number of data packets transmitted by the transmitting end−the number of data packets practically received by the receiving end)/the number of data packets transmitted by the transmitting end.

Figure 4:
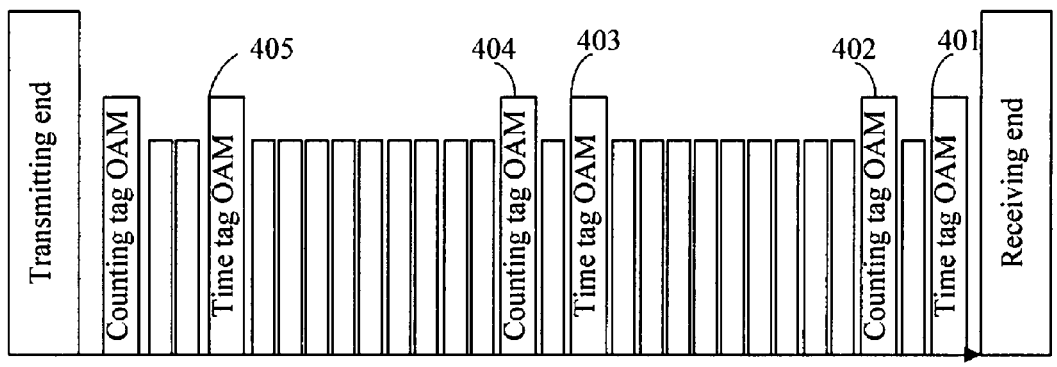
FIG. 4 is a schematic view of a third embodiment of the present invention.

The second embodiment of the present invention realizes packet loss rate detection based on that a transmitting end periodically transmits at least two OAM packets including a time tag OAM packet and a counting tag OAM packet. The time tag OAM is configured to delimit a time period, and the counting tag OAM is configured to record a counting value. The time tag OAM packet may be identical with the counting tag OAM packet in format, which are distinguished by the receiving end through type values or other extend information, or tags in other formats. The transmitting end periodically transmits the time tag OAM packets, and the counting tag OAM packet carries the counting value of the data packets transmitted before the time tag, as shown in FIG. 4, which includes the following steps.

In Step 41, an MEP of the transmitting end periodically transmits time tag OAM packets 401, 403, and 405, in which the time tag OAM packets may or may not carry the counting value of a current transmission counter.

In Step 42, the transmitting end counts the transmitted data packets in real time, and saves data of the counting value of several periods (set as required).

In Step 43, after transmitting a previous time tag OAM packet, the MEP of the transmitting end transmits the counting tag OAM packet corresponding to the current time tag after next one time tag (or next N time tags), in which the counting tag OAM packet carries the counting value of the data packets before the transmission of previous one time tag (or an Nth time tag) OAM packet. In FIG. 4, a counting tag OAM402 carries the counting value of the data packets transmitted before a time tag OAM401, and a counting tag OAM404 carries the counting value of the data packets transmitted prior to the transmission of a time tag OAM403.

In Step 44, the MEP of the receiving end parses the received OAM packets to obtain the counting value therein.

In Step 45, the receiving end performs subtraction between the counting values in the counting tag OAM402 and the counting tag OAM404 to obtain the number of the data packets transmitted by the transmitting end during the period and the time tag OAM401 to the time tag OAM403.

In Step 46, the receiving end saves data of the counting value of the data packets practically received at time points of the time tag OAM 401 and the time tag OAM 403 (several periods may be set as required), and performs subtraction between the values of the data packet counters at the transmitting end at the time points of the time tag OAM 401 and the time tag OAM 403 to obtain the number of the data packets practically received by the receiving end from the time tag OAM 401 to the time tag OAM 403.

In Step 47, the packet loss rate in the test period is obtained according to the formula (the number of data packets transmitted by the transmitting end−the number of data packets practically received by the receiving end)/the number of data packets transmitted by the transmitting end.

Figure 3:
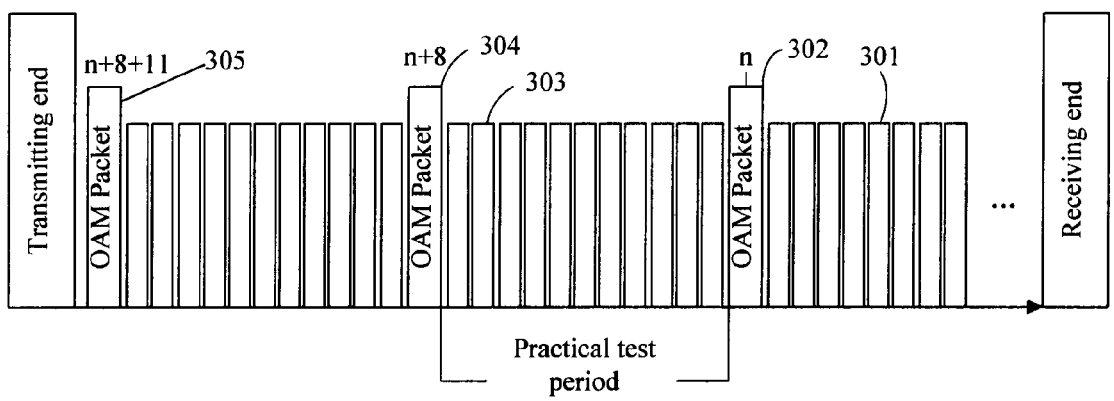
FIG. 3 is a schematic view of a second embodiment of the present invention.

The third embodiment of the present invention considers a case in which a transmitting end transmits OAM packets non-periodically. The transmitting end transmits one OAM packet at a time as required, in which the OAM packets have the same format and content. As shown in FIG. 3, data packets 301 and 303 are continuously transmitted, and specific steps are as follows.

In Step 31, a transmitting MEP transmits a first OAM packet 302 as required, in which the OAM packet may carry a counting value of any transmission counter as a start of a test period.

In Step 32, the transmitting MEP transmits a second OAM packet 304 after the test period, in which the current OAM packet carries the counting value of the transmission counter before the first OAM packet 302 is transmitted.

In Step 33, the transmitting MEP transmits a third OAM packet 305 at a time point (determined according to the capability of a device, yet the transmission should be completed before a next required measurement OAM packet is transmitted) after the second OAM packet 304 is transmitted, in which the OAM packet 305 carries the counting value of the transmission counter before the OAM packet 304 is transmitted.

In Step 34, the receiving end parses the OAM packet 305 and the OAM packet 304 to obtain the counting values therein, and performs subtraction between the counting values to obtain the number of the data packets transmitted by the transmitting end in the test period.

In Step 35, the receiving end performs subtraction between the counting values of the data packets in the periods of the OAM packet 302 and the OAM packet 304 to obtain the number of the data packets practically received in the test period.

In Step 36, the packet loss rate in the test period is obtained according the formula: (the number of data packets transmitted by the transmitting end in the test period−the number of data packets received by the receiving end in the test period)/ the number of data packets transmitted by the transmitting end in the test period.

Figure 5:
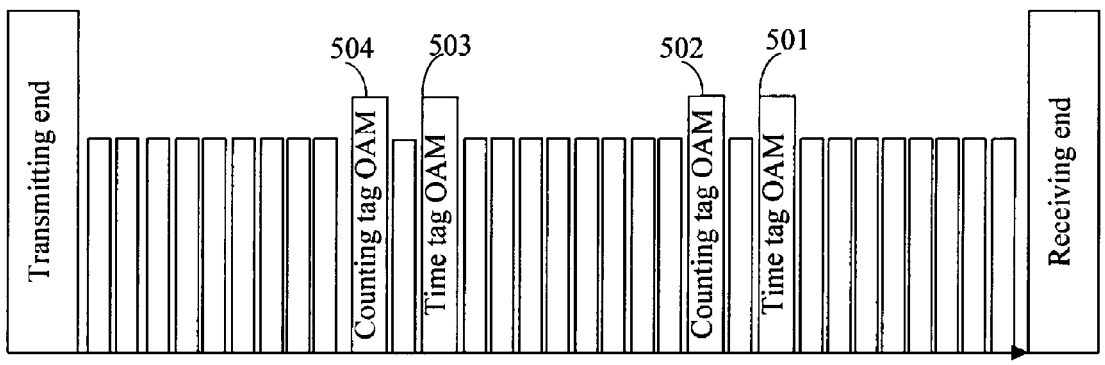
FIG. 5 is a schematic view of a fourth embodiment of the present invention.

The fourth embodiment of the present invention is the case in which a transmitting end transmits at least two OAM packets at a time as required, including a time tag OAM packet and a counting tag OAM packet, and as shown in FIG. 5, specific steps are as follows.

In Step 51, an MEP of the transmitting end transmits a test start time tag OAM packet 501 as required, in which the OAM packet 501 is configured to define a test start time, and may or may not carry a counting value of a current counter.

In Step 52, the counter at the transmitting end counts transmitted data packets in real time, and saves the counting values at the start and end of the test.

In Step 53, the MEP at the transmitting end transmits a start counting tag OAM packet 502 at any time (before or after a test end time tag, which can be determined according to the capability and purpose of a device, and this embodiment is before the test end time) after the test start time tag OAM packet, in which the counting tag OAM packet carries the counting value of the data packets before the test start time tag OAM packet 501 is transmitted.

In Step 54, the MEP of the transmitting end transmits a test end time tag OAM packet 503 as required.

In Step 55, the MEP of the transmitting end transmits a test end counting tag OAM packet 504 at any time after the test end time tag OAM packet, in which the counting tag OAM packet carries the counting value of the data packets before the test end time tag OAM packet 503 is transmitted.

In Step 56, the MEP of the receiving end receives and parses the counting tag OAM packet 504 and the counting tag packet 502 (the two OAM packets may be received in a different sequence, which is determined according to implementation of a specific device) to obtain the counting data carried therein, and performs subtraction between the counting values in the counting tag OAM packet 502 and the counting tag OAM packet 504 to obtain the number of the data packets practically transmitted by the transmitting end during the period from the time tag OAM packet 501 to the time tag OAM packet 503.

In Step 57, the receiving end performs subtraction between the data received at the time points of the time tag OAM packet 503 and the time tag OAM packet 503 to obtain the number of the data packets practically received by the receiving end during the period from the time tag OAM packet 501 to the time tag OAM packet 503.

In Step 58, the packet loss rate in the test period is obtained according to the formula (the number of data packets transmitted by the transmitting end−the number of data packets practically received by the receiving end)/the number of data packets transmitted by the transmitting end.

Figure 6:
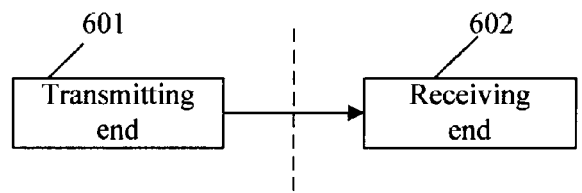
FIG. 6 is a schematic view of a packet loss rate detection system according to the present invention.

An embodiment of the present invention further provides a packet loss rate detection system. As shown in FIG. 6, the detection system includes a transmitting end 601 and a receiving end 602. The transmitting end 601 is configured to transmit data packets and OAM packets, and the receiving end is configured to receive the data packets and the OAM packets. The transmitting end transmits one OAM packet at a time, in which the OAM packet is configured to carry a counting value of the data packets transmitted before an Nth OAM packet prior to the current OAM packet, and define start and end time of a current test. The receiving end determines a start and an end of the test through the OAM packet, counts the data packets from the start to the end of the test, parses the OAM packet to obtain the counting value recorded therein, and obtains the number of the data packets transmitted by the transmitting end by calculating the difference between the numbers of the transmitted data packets recorded in the two OAM packets during a particular test period, in which N is a positive integer greater than or equal to 1, and the receiving end calculates the packet loss rate according to the difference and the number of the data packets practically received by the receiving end during the test period.

The transmitting end transmits at least two OAM packets at a time including a time tag OAM packet and a counting tag OAM packet, in which the time tag OAM packet is configured to define time, and the time tag OAM packet may be identical with the counting tag OAM packet in format, or different from the counting tag OAM packet in format, which can be distinguished by the receiving end through a type value or extend information. The counting tag OAM packet carries the counting value of the data packets transmitted before the transmission of an Nth time tag OAM packet prior to the current counting tag OAM packet. The receiving end receives the time tag OAM packet, defines a start and an end of the test, counts the data packets during the test period, parses the Nth counting tag OAM packet subsequent to the time tag OAM packet to obtain the counting value therein, and calculates the difference between the counting values in the OAM packets during the test period, in which the difference represents the total number of the data packets transmitted by the transmitting end, N is a positive integer greater than or equal to 1, and the receiving end calculates the packet loss rate according to the difference and the number of the data packets practically received by the receiving end during the test period.

An embodiment of the present invention further provides a data transmitting apparatus including a data transmission module. During the packet loss rate detection, the data transmission module is configured to transmit data packets and OAM packets, in which the OAM packets are configured to record the number of the transmitted data packets. The data transmission module may employ two manners to transmit the OAM packets. First, the data transmission module transmits one OAM packet at a time, in which the packet is configured to carry a counting value of the data packets transmitted before the transmission of an Nth OAM packet prior to the transmission of the OAM packet. Second, the data transmission module transmits at least two OAM packets at a time including a time tag OAM packet and a counting tag OAM packet, in which the formats of the time tag OAM packet and the counting tag OAM packet may be identical, and the receiving end distinguishes the tag OAM packet and the counting tag OAM packet through a type value or extend information, or the tag formats may also be different. The time tag OAM packet is configured to define time, and the counting tag OAM packet is configured to carry the number of the data packets transmitted before the transmission of an Nth time tag OAM packet prior to the transmission of the OAM packet, in which N is a positive integer greater than or equal to 1. The receiving end calculates the packet loss rate according to the received data packets and the parsed counting values carried in the OAM packets.

In conclusion, in the embodiments of the present invention, enough time are provided to write the counting value into the OAM packets during the transmission of the data packets, so that the OAM packets can accurately calculate the number of the transmitted data packets, thus accurately calculating the packet loss rate. Meanwhile, the embodiments of the present invention are implemented based on the current standards, and therefore are easy to be implemented.

The descriptions are merely specific embodiments of the present invention applicable to calculation of an OAM packet loss rate for packet switching technologies such as Multiprotocol Label Switching (MPLS), Transport MPLS (TM-PLS), Provider Backbone Transport (PBT), and Native Ethernet (ETH), but not intended to limit the present invention. Any modifications or replacements made by persons skilled in the art without departing from technical solutions disclosed in the present invention should fall within the scope of the present invention. Therefore, the scope of the present invention is subject to the scope of the claims.

Persons of ordinary skill in the art should understand that all or a part of the steps of the method according to the embodiments of the present invention may be implemented by a program instructing relevant hardware. The program may be stored in a computer readable storage medium, such as a Random Access Memory (RAM), a memory, a Read Only Memory (ROM), an Electrically Programmable ROM, an Electrically Erasable Programmable ROM, a register, a hard disk, a removable magnetic disk, a compact disc (CD)-ROM, or a storage medium of any other form known in the technical field.

What is claimed is:

1. A method for detecting packet loss rate, comprising:
receiving, at a receiving end device, data packets and Operation, Administration, and Maintenance (OAM) packets from a transmitting end device, wherein a second OAM packet received later than a first OAM packet carries a first counting value representing the number of data packets that are transmitted at the transmitting end device prior to transmission of the first OAM packet, and a third OAM packet received later than the second OAM packet carries a second counting value representing the number of data packets that are transmitted at the transmitting end device prior to transmission of the second OAM packet;
counting, at the receiving end device, the received data packets to obtain a third counting value and a fourth counting value, wherein the third counting value represents the number of data packets received prior to reception of the first OAM packet, and the fourth counting value represents the number of data packets received prior to reception of the second OAM packet;
parsing, at the receiving end, the OAM packets to obtain the first counting value and the second counting value; and
calculating, at the receiving end, a packet loss rote according to the first, second, third and fourth counting values;
wherein the number of data packets between any two consecutive OAM packets is variable.

2. The method according to claim 1, wherein the OAM packets are received by the receiving end periodically at a first time period, and the first, second and third OAM packet are received by the receiving end periodically at a second time period larger than the first time period.

3. The method according to claim 1, further comprising:
receiving, at the receiving end, a plurality of time tag OAM packets included in the OAM packets at a certain time period, wherein each time tag OAM packet is used for delimiting the certain time period and followed by one counting tag OAM packet included in the OAM packets, wherein each of the first, second and third OAM packets is a counting tag OAM packet, the second OAM packet carries a counting value of data packets that are transmitted at the transmitting end prior to transmission of a time tag OAM packet corresponding to the first OAM packet, the third OAM packet carries a counting value of data packets that are transmitted at the transmitting end prior to transmission of a time tag OAM packet corresponding to the second OAM packet.

4. The apparatus according to claim 1, further comprising:
receiving a plurality of time tag OAM packets at a certain time period, wherein each time tag OAM packet is used for delimiting a time period, and each of the first, second and third OAM packets corresponds to one of the time tag OAM packets.

5. A data receiving apparatus comprising a processor and memory, configured to perform the steps of:
receiving data packets and Operation, Administration, and Maintenance (OAM) packets from a transmitting end device, wherein a second OAM packet received later than a first OAM packet carries a first counting value representing the number of data packets that are transmitted at the transmitting end device prior to transmission of the first OAM packet, and a third OAM packet received later than the second OAM packet carries a second counting value representing the number of data packets that are transmitted at the transmitting end device prior to transmission of the second OAM packet;

counting the received data packets to obtain a third counting value and a fourth counting value, wherein the third counting value represents the number of data packets received prior to reception of the first OAM packet, and the fourth counting value represents the number of data packets received prior to reception of the second OAM packet;

parsing the OAM packets to obtain the first counting value and the second counting value; and calculating a packet loss rate according to the first, second, third and fourth counting values;

wherein the number of data packets between any two consecutive OAM packets is variable.

6. The apparatus according to claim 5, wherein the OAM packets are received by the receiving end periodically at a first time period, and the first, second and third OAM packet are received by the receiving end periodically at a second time period larger than the first time period.

7. A system for detecting packet loss rate, comprising a transmitting end device and a receiving end device, wherein, the transmitting end device is configured to:

transmit data packets and Operation, Administration, and Maintenance (OAM) packets; store a plurality of counting values of data packets including a first and second counting values, the first counting value representing the number of data packets transmitted prior to transmission of a first OAM packet proximately subsequent thereto, and the second counting value representing the number of data packets transmitted prior to transmission of a second OAM packet proximately subsequent thereto, wherein the second OAM packet is; and write the first counting value into an Nth OAM packet subsequent to the first OAM packet and the second counting value into an Nth OAM packet subsequent to the second OAM packet, and N is a positive integer greater than or equal to 1; and the receiving end device is configured to:

receive the data packets and the OAM packets;

count data packets received prior to reception of the first OAM packet to obtain a third counting value of data packets and data packets received prior to reception of the second OAM packet to obtain a fourth counting value of data packets; parse at least some of the received OAM packets to obtain the first counting value and the second counting value; and calculate a packet loss rate according to the first, second, third and fourth counting values;

wherein the number of data packets between any two consecutive OAM packets is variable.

8. The system according to claim 7, wherein the transmitting end is configured to transmit the OAM packets including the first and second OAM packets periodically at a certain time period.

9. The system according to claim 7, wherein the transmitting end is configured to transmit time tag OAM packets including the first and second OAM packets periodically at a certain time period, each time tag OAM packet being used for delimiting the certain time period and followed by one counting tag OAM packet, wherein each of the OAM packet carrying the first counting value and the OAM packet carrying the second counting value is a counting tag OAM packet.

* * * * *

UNITED STATES PATENT AND TRADEMARK OFFICE
CERTIFICATE OF CORRECTION

PATENT NO. : 8,730,821 B2
APPLICATION NO. : 13/085695
DATED : May 20, 2014
INVENTOR(S) : Song et al.

Page 1 of 1

It is certified that error appears in the above-identified patent and that said Letters Patent is hereby corrected as shown below:

In the Claims:

*Column 8, Claim 1, Line 28 "packet loss rote" should read --packet loss rate--.*

Signed and Sealed this
Sixteenth Day of September, 2014

Michelle K. Lee
*Deputy Director of the United States Patent and Trademark Office*